MAGNETIC TAPE-TO-FILM PHOTOGRAPHIC SYSTEM

Filed Sept. 20, 1954

JOHN M. ANDREAS
WILLIAM F. SCHREIBER
GEORGE T. INOUYE
INVENTORS

BY Lyon & Lyon
ATTORNEYS

United States Patent Office 2,816,157

Patented Dec. 10, 1957

2,816,157

MAGNETIC TAPE-TO-FILM PHOTOGRAPHIC SYSTEM

John M. Andreas, Pasadena, William F. Schreiber, North Hollywood, and George T. Inouye, Los Angeles, Calif., assignors to Technicolor Motion Picture Corporation, Hollywood, Calif., a corporation of Maine Application September 20, 1954, Serial No. 457,214

5 Claims. (Cl. 178—5.2)

This invention relates to a system for reproducing information recorded on magnetic tape and, more specifically, to an apparatus and system for obtaining photographic images suitable for providing color pictures from color video tape recordings.

In an article in the RCA Review for March 1954, page 3, entitled A system for recording and reproducing television signals by H. F. Olson et al., there is described color video recording on magnetic tape. In the system described, a separate recording track is provided for each of the primary color video signals, for audio signals, and for sync signals. There are five tracks in all.

It is desirable to take the information recorded on tape and convert it into photographic images on film negatives in order that the video programs recorded in color on the tape may be shown using the customary film movie projectors. One method for photographing the tape-recorded signals in color is to form a color image on a color kinescope and photograph the face of the tube with a three-strip camera or a color negative film. These methods of converting tape signals to color images on film are workable but produce a loss of resolution when a three-phosphor dot-tube is used. Other known color tubes have faults such as poor registration or poor color reproduction for movie recording.

An object of this invention is to provide an improved apparatus and system for recording images on film from color signals recorded on magnetic tape.

Another object of the present invention is to provide a system and apparatus for recording images on film from color video signals on magnetic tape without losing either resolution or registration.

Still a further object of the present invention is to provide a novel and useful system and apparatus for recording images on film from video signals on magnetic tape.

These and other objects of the invention are achieved by converting the simultaneously recorded signals on magnetic tape to a field-sequential scanning arrangement, applying the field-sequential signals to a single kinescope, the screen of which is photographed to make a successive frame negative or positive in monochrome which is usable for making color film.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
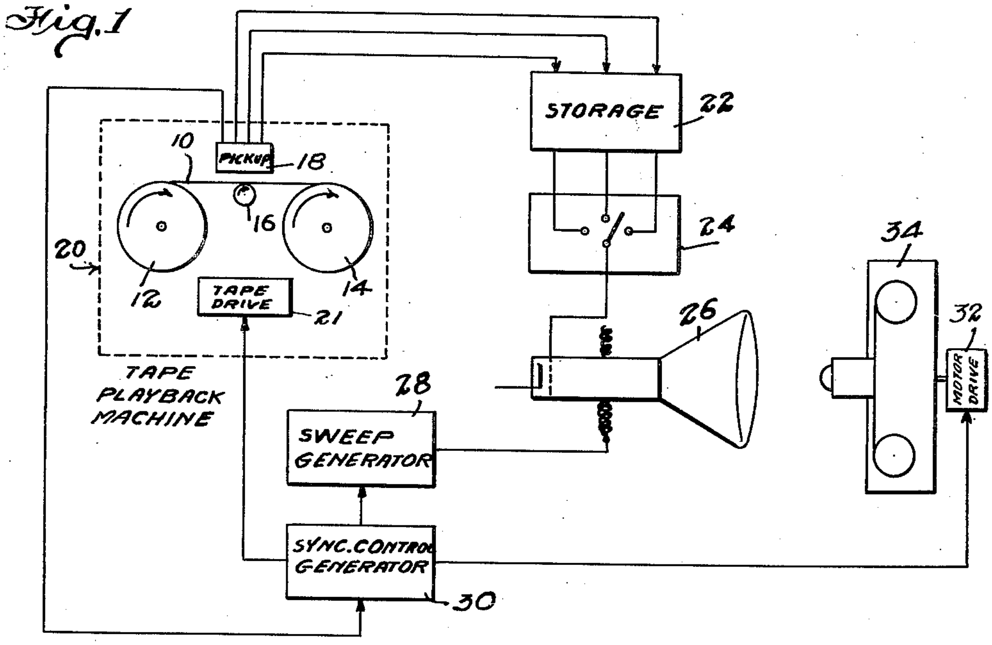
Figure 1 is a schematic diagram of an embodiment of the invention.

In the previously referred to article of the RCA Review, in the recording system described the three primary colors are represented on three tracks by the signals recorded on the tape. In Figure 1, the tape driving system is shown considerably simplified and includes the magnetic tape 10 on which the color video signals are recorded, which extends from a storage reel 12 to a takeup reel 14. A capstan 16 drives the tape underneath the reading transducers 18. All this apparatus is included in a dotted rectangle which is entitled "tape playback machine" 20. The drive motors for the reels and capstan, all of which have their speeds synchronized, are included in the rectangle labeled "tape drive" 21. This apparatus is described in the RCA Review article noted above.

The output from the tape will consist of five signals, as previously noted. These are the three primary color signals, the audio signals, and the sync signals. The three primary color signals are simultaneously applied to a storage apparatus 22 which separately records them a frame at a time. The output from the storage apparatus 22 is applied in sequence by means of an electronic switch 24 to a kinescope 26. The deflection of the kinescope is controlled from a sweep generator 28. The sweep generator is controlled by means of a sync control generator which is synchronized with the sync signals being read from the tape. The sync control generator 30 also controls the tape drive 22 and the motor drive 32, which drives the film in a cartoon-type of camera 34. This is a camera which is used to take pictures a frame at a time in sequence.

The electronic switch 24 applies the signals from the storage apparatus a frame at a time in sequence to the kinescope 26. Accordingly, there will be displayed in sequence on the kinescope screen first, for example, a frame of video corresponding to the red, then a frame corresponding to green, and then a frame corresponding to blue. Then this sequence is repeated. The cartoon-type camera, in view of its synchronization, will take a picture of each frame in the same sequence. Accordingly, the camera will finally produce a monochrome film having three-color separation negatives. This film may then be used to produce color prints by any of the methods known in the art, such as the dye-transfer process. In this manner, color prints are produced which do not have the defects of the other suggested methods, namely, loss of resolution, poor color reproduction, or poor registration.

Either the frame scan, as described, with intermittent film motion is possible or a line scan with a continuous film motion may be used, if desired. The storage apparatus enables two functions to be performed: one is the simultaneous-to-sequential conversion of the signals and the second is the 30-to-24-frame conversion required for motion picture projection. No color wheel or any other difficult and expensive color apparatus is required in this system, since all recording is being done on the film on a color separation or monochrome basis. The film can then be subsequently processed in any well-known commercial manner, such as the dye-transfer process, to produce a finished color film suitable for projection. The audio portion of the program may be subsequently added to the finished film.

With this system, it is possible to operate at a rate substantially slower than that required in the usual practice, and this enormously reduces the engineering problems involved. There is obtained by this system a quality of product which is substantially equal to the quality of the original magnetic record. Other systems are being developed presently for recording the video signals in sequence instead of side-by-side, as in the RCA system. The principles described herein are still utilizable, since all that is required is the insertion of means to separate the primary color signals as they are being read from the tape, sending each one to its associated primary color storage medium.

Figure 2:
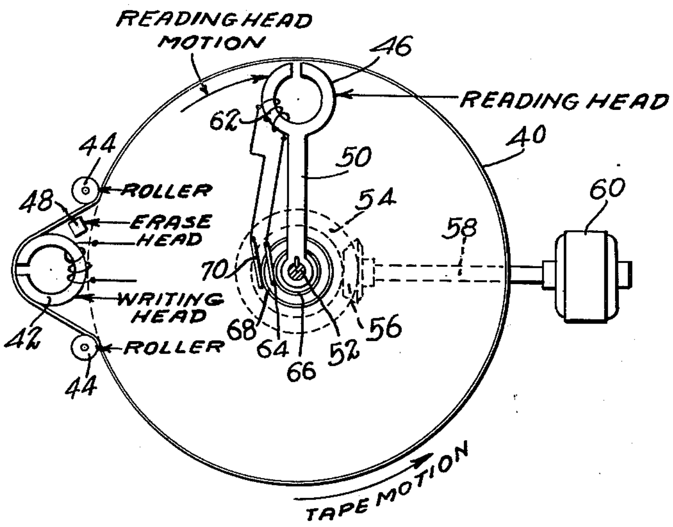
Figure 2 is a schematic drawing showing the details of the storage system employed in Figure 1.

The tape drives, sync-control generator, sweep generator, and camera-motor drive are well-known, commercially purchasable items. Referring now to Figure 2, a storage apparatus suitable for employment in the embodiment of the invention is shown. For each primary color there may be provided a separate tape loop or there may be provided a single tape loop having three separate tracks. In either event, as shown in Figure 2, a single tape loop consists of the loop 40, which is deformed out of a circular pattern sufficiently to encompass a writing head 42. A pair of driven rollers 44 are provided to drive the tape in a counterclockwise direction. A reading head 46 is supported by an arm 47 for rotation in a circle on the inside of the tape loop. The reading head rotates in a clockwise direction. The tape runs in a circular path for about nine-tenths of its arc, and, for the other one-tenth, is diverted to allow placement of the writing head outside the circular arc. Accordingly, the reading head rotation plays the signal back for nine-tenths of the arc. The signals from the reading head are applied to the electronic switch 24 via commutating rings (not shown) on the shaft driving the arm 47. The peripheral velocity of the reading head is made twice the linear tape speed and in the opposite direction, so that the information is read off in one-third the time taken for recording. Thus, each record is read three times before being erased by the erasing head 48 for recording the signals for the next frame. The electronic switch 24 performs the keying at a frequency so that each color frame is presented on the output tube once and all three are presented in the time originally taken for one color frame. In this manner, all the original color information is recorded in monochrome on the photographic film. For a single tape loop with three tracks there are three reading heads, three erasing heads, and three writing heads over the single tape loop. When three tape loops are used, only one of the three heads is used for each tape loop. The conversion from 30 to 24 frames per second may be made, for example, by blanking the cathode-ray tube every fifth complete frame and by preventing the film advance at the same time. Alternatively, at a higher film cost, the same effect could be produced by making 30-frame separation records and printing 24-frame records from them in a special-effects printer, which might superimpose every second and third frame to give a smoother reduction to the desired 24-frame rate.

Accordingly, there has been shown and described herein a novel, useful, and inexpensive system and apparatus for recording photographically video color signals from a magnetic tape. The system is simple and enables the obtention of color-separation negatives on a monochrome basis which has a quality substantially equal to the quality of the original magnetic record. The resultant monochrome pictures are easily processed to present a finished color motion picture which has substantially the same resolution as the tape from which the signals are taken.

We claim:

1. A system for photographing color video signals recorded on magnetic tape comprising means to derive from said tape color video signals representative of each primary color for a frame, a cathode-ray tube having a screen, means to apply each of said primary color representative signals for a frame in sequence to said cathode-ray tube, and camera means to photograph each of said different primary color frames represented on the screen of said cathode-ray tube.

2. A system for photographing color video signals recorded on magnetic tape comprising a separate storage means associated with each of the primary colors of said color video signals recorded on said tape, each said storage means having the capacity to store signals for one frame, means to transfer primary color video signals from said tape into the associated storage means at one rate, a cathode-ray tube having a screen, means to read out recorded signals from each of said storage means in sequence at a rate which is a multiple of recording a frame in said respective storage means, means to apply said readout signals to said cathode-ray tube to reproduce in sequence on said screen a frame of each primary color video signal, and camera means to photograph each of said different primary color frames in sequence.

3. A system for photographing color video signals recorded on magnetic tape as recited in claim 2 wherein said separate storage means each comprises a magnetic tape loop movable in one direction, a fixed magnetic writing head, and a movable reading head, movable in a direction opposite to that of said tape loop.

4. A system for photographing color video signals recorded on magnetic tape as recited in claim 2 wherein said separate storage means comprises a single tape loop having a separate track for each of the primary color video signals, said tape loop being movable in one direction, a fixed magnetic writing head positioned over each of said tracks, and a movable reading head positioned over each of said tracks and movable in a direction opposite to that of said tape loop.

5. A system for photographing color video signals recorded on magnetic tape comprising means to derive from said tape color video signals corresponding to each primary color for a frame, means to separately store each of said primary color signals for a frame, each of said means to store separately including a magnetic tape loop, means to rotate the tape in said loop, a writing head, a reading head, means to rotate said reading head around said tape loop in a direction opposite to that of said tape motion, said tape loop being shaped to have an extra loop to enable said reading head rotation without interfering with said stationary writing head, a cathode-ray tube having a screen, means to apply to said cathode-ray tube in sequence the signals derived from each of said reading heads, a camera positioned in front of said screen to photograph each frame displayed on said screen, and means to synchronize said tape speed, said cathode-ray tube display, and the speed of operation of said camera.

References Cited in the file of this patent

UNITED STATES PATENTS

| | | |
|---|---|---|
| 1,605,023 | Hartley | Nov. 2, 1926 |
| 1,945,626 | Baird | Feb. 6, 1934 |
| 2,587,006 | Smith | Feb. 26, 1952 |
| 2,664,465 | Gillette | Dec. 29, 1953 |